United States Patent
Carter et al.

(10) Patent No.: US 6,219,652 B1
(45) Date of Patent: Apr. 17, 2001

(54) NETWORK LICENSE AUTHENTICATION

(75) Inventors: Stephen R. Carter, Spanish Fork; Donald H. LaVange, Jr., Pleasant Grove; Delos C. Jensen, Orem, all of UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/088,114

(22) Filed: Jun. 1, 1998

(51) Int. Cl.[7] .................................................. G06F 17/60
(52) U.S. Cl. ............................................. 705/59; 713/200
(58) Field of Search .................................... 705/1, 37, 53, 705/56, 59, 75, 76; 380/1, 23; 364/130, 131, 468.22; 395/712, 200.47, 200.48, 200.49, 187.01, 188.01

(56) References Cited

U.S. PATENT DOCUMENTS

| | | |
|---|---|---|
| 4,924,378 | 5/1990 | Hershey et al. . |
| 5,138,712 | 8/1992 | Corbin . |
| 5,438,508 | 8/1995 | Wyman . |
| 5,553,139 | 9/1996 | Ross et al. . |
| 5,553,143 | 9/1996 | Ross et al. . |
| 5,671,412 | 9/1997 | Christiano . |
| 5,689,565 * | 11/1997 | Spies et al. .............................. 380/25 |
| 5,715,314 | 2/1998 | Payne et al. . |
| 5,724,424 | 3/1998 | Gifford . |
| 5,758,069 * | 5/1998 | Olsen .................... 713/201 |
| 5,765,152 * | 6/1998 | Erickson .................................. 707/9 |
| 5,790,677 * | 8/1998 | Fox et al. ................. 380/24 |
| 5,818,933 * | 10/1998 | Kambe et al. ........................ 705/57 |
| 5,848,158 * | 12/1998 | Saito et al. .............................. 705/54 |
| 5,850,442 * | 12/1998 | Muftic ................................... 380/21 |
| 5,883,810 * | 3/1999 | Franklin et al. ................. 364/479.02 |
| 5,892,900 * | 4/1999 | Ginter et al. .......................... 713/200 |
| 5,903,650 * | 5/1999 | Ross et al. .............................. 705/59 |
| 5,903,721 * | 5/1999 | Sixtus .................................. 713/201 |
| 5,905,860 * | 5/1999 | Olsen et al. ............................... 380/4 |
| 5,923,754 * | 7/1999 | Angelo et al. .......................... 705/54 |
| 5,991,876 * | 11/1999 | Johnson et al. ...................... 713/200 |
| 6,006,332 * | 12/1999 | Rabne et al. .......................... 713/201 |

FOREIGN PATENT DOCUMENTS

WO00/08909 * 8/1999 (WO) .

OTHER PUBLICATIONS

Schneier, Bruce. "Appied Cryptography 2d." (New York: John Wiley & Sons, Inc. 1996) pp. 169–185 & 483–496.*

PGP for Personal Privacy, Version 5.0 Users Guide for Windows, Chapter 6, "Security Features and Vulnerabilities", pp. 81–101, PGP, Inc., Jun., 1997.

(List continued on next page.)

*Primary Examiner*—James P. Trammell
*Assistant Examiner*—John Leonard Young
(74) *Attorney, Agent, or Firm*—Dinsmore & Shohl LLP

(57) ABSTRACT

A method and system for license authentication over a network. An on-line vendor receives a digital certificate that includes a public key associated with a consumer, and a digital signature of the consumer. A license packet is generated that includes a unique serial number. A record that includes the digital certificate is stored in a memory. The license packet is optionally encrypted with the public key associated with the consumer, and the license packet is forwarded to the consumer. When a post-sale service is required, the consumer generates a request that includes the digital signature of the consumer, and the request is forwarded to the vendor. The vendor accesses the memory to authenticate that the request was sent by the consumer, and if so, the service request is fulfilled.

13 Claims, 1 Drawing Sheet

OTHER PUBLICATIONS

"Introduction to Public Key Cryptography", World Wide Web Publication, Verisign, Inc., 1998.

"Introduction to Message Privacy", World Wide Web Publication, PGP, Inc., 1997.

"TestDrive/Internet", World Wide Web Publication, TestDrive Corp., Publication date unknown.

"What's New in VBox", World Wide Web Publication, Preview Software, Publication date unknown.

"Make Your E–Mail Private Using that 'ENCRYPTION' Thing You've Heard About", Streeby, The Salt Lake Tribune, Feb., 1996.

"What is PGP, Anyway?", Cat's Home, World Wide Web Publication, Jun., 1997.

"Crypto Primer", World Wide Web Publication, Ziff–Davis TV, Inc., 1996.

"Sales Agent", World Wide Web Publication, Release Software Corporation, Publication date unknown.

"Internet Shrinkwrap", Krasnove, PC Magazine, Nov., 1997, p. 40.

\* cited by examiner

NETWORK LICENSE AUTHENTICATION

FIELD OF THE INVENTION

The present invention relates to authentication of rights over a network, and specifically to a mechanism for electronically authenticating that a purchaser has a license to use certain resources.

BACKGROUND OF THE INVENTION

The use of the Internet as a sales medium is greatly increasing. If a product is in an electronic format, such as a software program, or digitized music, the entire transaction from payment to shipment of the product can be handled without human interaction through software running on the vendor's World Wide Web (Web) site. Where the product cannot be electronically downloaded, the Internet can be used as a mechanism for selection of and payment for the product. The product can then be shipped to the consumer through conventional channels.

From a consumer standpoint, purchasing a product over the Internet reduces costs associated with traveling to a merchant, and substantially reduces the amount of time it would otherwise take to purchase the product. From a vendor's standpoint, use of the Internet as a sales medium greatly reduces overhead. Leases, buildings, and furnishings necessary for a physical presence are eliminated. The fabulous success of some of the first Internet-based "virtual" stores lends credibility to the estimates of the magnitude of future Internet-based sales.

Mechanisms for purchasing goods over the Internet are well known. A vendor implements a Web site which allows a consumer, through the use of a browser, to select the desired goods. After the goods are selected, the consumer typically enters a credit card number to complete the sale. The credit card number is typically encrypted at the browser and decrypted at the vendor's Web site, to reduce or eliminate the possibility of a third party intercepting the credit card number.

Many vendors use the Internet for post-sale support as well. It is not uncommon for a purchaser of software to be directed to the vendor's Web site to download recent patches, upgrades, or to seek support. Even where the initial purchase was not consummated over the Internet, consumers are often directed to a vendor's Web site for such post-sale support. Such support can include the ability to search databases of known problems and suggested resolutions, the ability to access in-depth technical information about a product, or the ability to communicate via e-mail with a support representative, for example. Post-sale support interaction with the consumer will become an increasingly important distinguishing feature of Internet-based vendors, since such vendors frequently offer goods at nearly identical prices.

Currently, providing post-sale support can be very expensive for a vendor. Before support is provided, it is typically desirable to authenticate that the individual seeking support is a customer of the vendor. Where support requests are initiated by telephone, a customer representative typically requires the caller to provide a unique identifier, such as a serial number which accompanied the product, before support will be provided. A product serial number is also frequently required when the consumer seeks support over the Internet. One problem with using a serial number for authentication purposes is that a valid customer can share the serial number with other individuals who can then use the serial number to access the vendor's support services, even though those individuals never purchased a product. For example, after copying a bona fide purchaser's licensed software, and serial number, such individuals can use the serial number to obtain free upgrades to products which they illegally copied in the first place.

Providing support services to unauthorized users results in loss of revenue and requires larger support resources than would otherwise be required. Because vendors are not compensated for such unauthorized use of post-sale services, it will become increasingly important for Internet-based businesses to ensure that the entity seeking support is a valid customer. Ideally, the complete process from purchase of a product over the Internet to subsequent post-sale access of a vendor's Web site could be handled automatically, without human intervention, and yet in an extremely secure fashion such that unauthorized individuals cannot utilize the vendor's post-sale resources. Moreover, the ability to detect a request from an unauthorized, or unlicensed user allows the vendor to offer the user the opportunity to purchase a licensed product.

U.S. Pat. No. 5,715,314 to Payne et al. discloses a network-based sales system relating to an initial purchase of a product over a network. The system includes a buyer computer, a merchant computer and a payment computer. The buyer computer sends an access message that includes a product identifier and an access message authenticator based on a cryptographic key to the merchant computer. The merchant computer verifies that the access message authenticator was created using the cryptographic key, and then causes the product to be sent to the user.

U.S. Pat. Nos. 5,138,712; 5,553,143; 5,553,139; and 4,924,378 relate to distribution or management of software licenses during installation or execution of software on a computer. None of the references appear to disclose electronic mechanisms for authenticating customers for post-sale support.

It is apparent that a method and system that electronically and automatically validates that a requestor of a resource, such as a post-sale service, is a valid purchaser of the vendor's product would be highly beneficial, and would reduce costs associated with providing post-sale support services.

SUMMARY OF THE INVENTION

It is one object of the present invention to provide a method and system for greatly reducing costs associated with providing network-based post-sale support services.

It is another object of the present invention to provide a method and system for reducing or eliminating human involvement in granting a license to use a product.

It is yet another object of the present invention to provide a method and system for reducing human involvement in verifying the authenticity of a customer.

It is still another object of the present invention to provide a method and system for eliminating unauthorized access to a vendor's support resources.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. To achieve the foregoing and other objects and in accordance with the purpose of the present invention, a method and system are provided for authenticating a license over a network. The method includes receiving a digital certificate that includes a public key associated with a requestor, and a digital signature associated with the requestor. A license packet is generated that includes a unique serial number. A record that includes the digital certificate associated with the requestor is stored in a memory. A digital signature is generated and included in the license packet. The license packet is encrypted with the public key associated with the requestor, and the license packet is forwarded to the requestor. The requestor subsequently issues a request for a service, such as post-sale support services, the request including the digital signature associated with the requestor. The memory is accessed and the request is authenticated, and if the request is authentic, the request is fulfilled.

According to one embodiment of this invention, public/private key encryption is used to authenticate the requestor. There are two stages in the authentication process according to this invention. A first stage involves a purchaser providing certain identifying information, such as a digital certificate, that the vendor stores in a license store. The second stage involves a request for services. The request includes information that the vendor can use to search the license store to authenticate that the entity seeking services is the same entity that provided the identifying information in the first stage. The first stage typically occurs during the initial interaction between the requestor and the product vendor, for example upon initial purchase of the product for a network-based sale, or during electronic registration for a conventional purchase. The requestor forwards a digital certificate identifying a public key associated with the requestor to the vendor over a network, such as the Internet. This digital certificate is saved in the license store for later authentication of a post-sale request by the requestor.

If the product is purchased and downloaded over the Internet, the unique serial number can be generated by the vendor and forwarded to the requestor. If the purchase was through a channel other than the Internet, the serial number could accompany the actual product, and could be included in the request from the requestor to the vendor for post-sale support or during a preliminary transaction, such as registration of the product. The vendor maintains a license store of records obtained from requestors. Each record can include a digital certificate that is associated with a particular requestor. Upon a request for post-sale support, the vendor accesses the license store and determines if the digital signature associated with the request can be authenticated either with a requestor certificate in the license store or with a digital certificate sent with the request. Either of the digital certificates should be authenticated with the certifying authority before use. For further verification the serial number can be included in the request, and the serial number can likewise be authenticated against a serial number maintained in the record from the license store. If the digital signature and/or license number in the request are authenticated against a record maintained in the license store, access to post-sales support can be given to the requestor. Because private keys are not generally shared among users, the use of a digital signature as an authentication mechanism eliminates unauthorized access of post-sale services. Moreover, a hardware token can be used to completely inhibit sharing of private keys, providing further confidence in the post-sale service request.

According to another embodiment of the present invention, a system for validating a request from a requestor is provided. A first packet having a digital certificate with a public key and digital signature associated with the requestor is generated. A license granting entity receives the first packet, authenticates the first packet and generates a license packet The license packet includes a unique serial number and a digital signature associated with the license granting entity. A record that includes the digital certificate is stored in a memory. The license granting entity encrypts the license packet with the public key and forwards the license packet to the requestor. A second packet including a request for a resource and the unique serial number is communicated from the requestor to a license inspection entity upon demand for a post-sale resource. An authentication utility receives the second packet and authenticates that the second packet was forwarded by the requestor before giving the requestor access to the resource.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to preferred embodiments of the invention, examples of which are illustrated in the accompanying drawings, wherein like numerals indicate the same elements throughout the views.

DETAILED DESCRIPTION OF PREFERRED EMBODIMENTS

Figure 1:
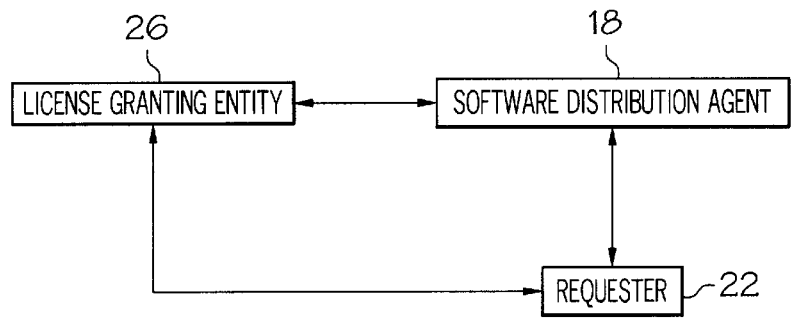
FIG. 1 is a block diagram illustrating certain aspects of the present invention.

FIG. 1 is a block diagram illustrating certain aspects of the present invention. A requestor 22 can comprise an entity which seeks to obtain a product, such as a software program, over a network, such as the Internet. Requestor 22 typically includes a network-attached computer, a software program capable of communicating over a network, such as a browser, and a user that uses the computer and browser to interact with a vendor's electronic business, such as a World Wide Web (Web) site. A software distribution agent 18 receives a request from requestor 22 to obtain a product. Software distribution agent 18 can comprise an electronic embodiment of a product manufacturer or a reseller. The interface used by software distribution agent 18 to interact with requestor 22 is typically one or more Web pages. Such Web pages are well known to those skilled in the art, and can be accessed by a number of commercially available Web browsers, such as MICROSOFT INTERNET EXPLORER or NETSCAPE NAVIGATOR Such Web sites typically allow the communication of information in an encrypted format, such as the Secure Sockets Layer of the HTTP protocol. Use of encryption greatly reduces, or eliminates, any chance that a third party can obtain confidential information, such as a credit card number, used by requestor 22 to pay for the product purchased from software distribution agent 18.

Software distribution agent 18 communicates the successful acquisition of a product to a license granting entity 26. The phrase "license" as used herein refers to a right to a certain thing. License granting entity 26 can obtain a unique serial number and incorporate the serial number into the software that will be downloaded to requestor 22. The product can then be downloaded to requestor 22 for installation on the respective computer. While a product is being installed on a computer, it is common for a dialog box to display the terms of a license agreement. The user can typically either accept the terms of the license agreement by clicking "OK" on a button within the dialog box, or reject the terms of the license agreement, in which event the software installation process terminates. If the user accepts the terms of the license agreement, the product is installed on the computer.

According to another aspect of the present invention, software distribution agent 18 immediately downloads the software to requestor 22 instead of communicating with license granting entity 26. Upon acceptance of the terms of the license agreement, the installation software communicates directly with license granting entity 26 and obtains a serial number for use with the software.

Figure 2:
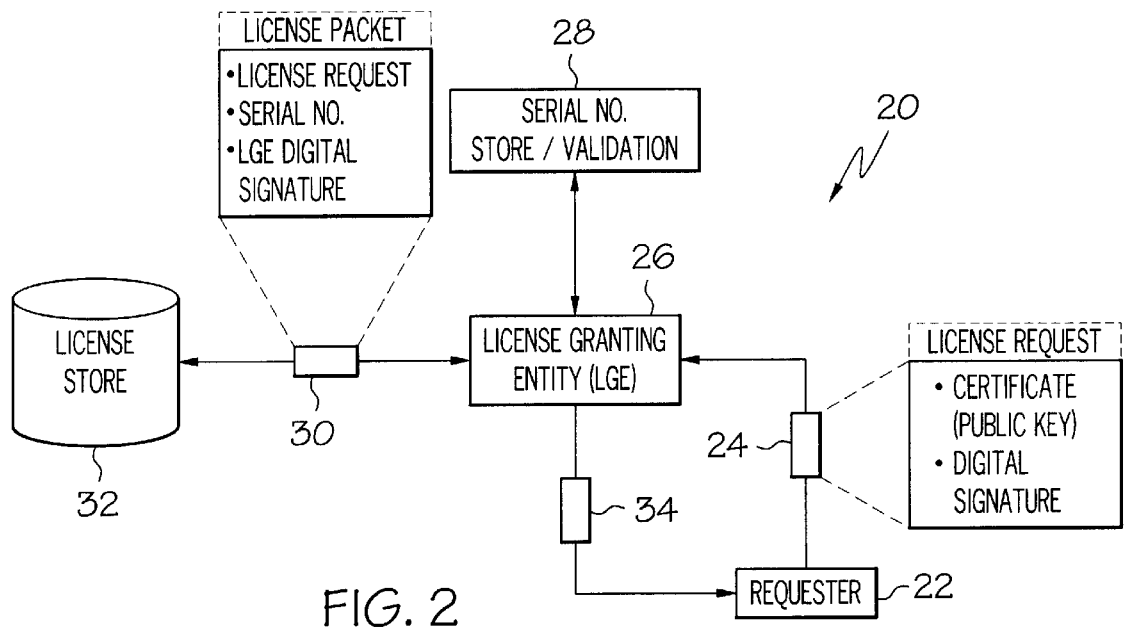
FIG. 2 is a block diagram illustrating communications between a requestor and a license granting entity according to one embodiment of the present invention.

FIG. 2 illustrates in greater detail the communications during the initial grant of a license to requestor 22. For simplicity of illustration, it is assumed that license granting entity (LGE) 26 and software distribution agent 18 are one entity, represented by LGE 26. The present invention can be described as occurring in two phases. During the first phase of the invention, a purchaser provides certain identifying information to the vendor. This information will be used in the second phase to authenticate that a subsequent request for post-sale services originates from a licensed user. FIG. 2 relates to the first phase of the invention. In a first embodiment of the present invention, it is assumed that an electronic product, such as a software program, is purchased over the Internet. While the invention will be described with reference to the purchase of a software program, it is apparent that the invention could be used with other digital products, such as digital music, or digital publications, such as books or magazines. At some point during the installation of the product on the computer associated with requestor 22, a decision will be made to grant a license to requestor 22. This license gives requestor 22 the right to use the product, and the right to access post-sale support resources of the vendor. This license grant may occur immediately after a user has assented to the terms of a legal license agreement. Alternatively, it may occur during a software registration phase after the installation of the software on the computer. In either event, the process described herein with regard to FIG. 2 relates to requestor 22 obtaining a license, or grant of a right, from the vendor to future support-related services.

The present invention uses public key cryptography for encryption and identification purposes. Public key cryptography is a technology well known to those skilled in the art, and will not be discussed in detail herein. Mechanisms for updating and/or changing public key pairs are also well known to those skilled in the art, and will not be discussed in detail herein. Each requestor 22 obtains a unique public key and private key. The public key is made publicly available. Public key cryptography provides two primary functions, encryption and identification. Briefly, the encryption aspects of public key cryptography involve encrypting a message with the public key of the entity to whom the message will be sent, and then forwarding the encrypted message to the recipient. The message can only be decrypted with the recipient's private key, precluding other entities from reading the message. Thus, the recipient publishes its public key to allow entities to generate and forward to the recipient an encrypted message, but maintains its private key in confidence.

Another aspect of public key encryption relates to identification, or authentication. A sender generates a message, and then applies an algorithm to the message to create a message digest. The message digest is encrypted with the sender's private key, creating a "digital signature" of the sender. The recipient receives the message and applies the same algorithm to the message to create a locally generated message digest. The sender's public key is then used to decrypt the sender's "digital signature" and the decrypted digital signature is compared to the locally generated message digest. If they are identical, the authenticity of the message is established, because only the entity in possession of the private key could have created the digital signature.

One problem with public key cryptography relates to authenticating the validity of an entity's public key. For example, assume User C sends User A a message and alters the return address field to make the message appear as if it were sent by User B. The message includes a public key allegedly belonging to User B. In short, User C pretends she is User B. Not knowing that the message originated from User C, User A believes the public key belongs to User B. User A uses the public key to encrypt a new message and send it to User B. User C intercepts the message and uses its private key (which corresponds to the public key it forwarded to User A) to decrypt and read the message that was intended for User B. To prevent this deceptive practice, certification organizations have been created for the purpose of providing authentication of public keys. This authentication typically takes the form of a digital "certificate." A certificate is an authentication, or credential, that the public key is in fact an authentic public key of a particular entity. The certificate includes the entity's public key and is digitally signed, as described above, by the certification organization. Because the certification organization's public key is well known and easily available, it is easy for an entity to validate the authenticity of the certificate itself.

Requestor 22 generates a license request 24 and communicates the license request 24 to LGE 26. As indicated above, this license request could occur at any one of several different stages. For example, the license request could be generated at the time of product purchase, during the installation of the software upon acceptance of the terms of a license agreement, or during subsequent registration of the product. The LGE 26 can be a separate entity or the same entity from which requestor 22 purchased the product. The license request 24 includes a digital certificate, which includes the public key associated with requestor 22. License request 24 also includes a digital signature of requestor 22. LGE 26 receives license request 24 and obtains a unique serial number from the serial number store 28. Serial number store 28 can comprise a list or database of unique serial numbers, or a software module that provides unique serial numbers upon request. LGE 26 creates a license packet 30 which includes the serial number obtained from serial number store 28, and optionally license request 24. LGE 26 can also digitally sign license packet 30. License packet 30 is stored in a memory such as license store 32. License store 32 can comprise any type of digital storage device, such as a random access memory, or a persistent storage device such as a hard drive. Although it is not necessary for LGE 26 to digitally sign license packet 30, the digital signature can be used to ensure that the license packet 30 has not been tampered with when LGE 26 later obtains the license packet 30 from license store 32 for authentication purposes. LGE 26 then preferably uses the public key of requestor 22 (obtained from license request 24) to encrypt license packet 30 to create a license packet 34, which is then communicated to requestor 22. By encrypting license packet 34 with the public key of requestor 22, it is ensured that the packet cannot be utilized by an entity that intercepts license packet 34, however, it is not mandatory that license packet 30 be encrypted. LGE 26 can also digitally sign license packet 30 with its private key before forwarding it to requestor 22, so that requestor 22 can verify that the packet came from LGE 26. Requestor 22 decrypts license packet 34 with its private key, and stores the serial number contained therein for later use, as described below.

According to another embodiment of the present invention, requestor 22 may have purchased a product through conventional channels, such as at a retail outlet. Future support of the product may be dependent upon registration of the product with the vendor's Web site. In this embodiment, requestor 22 generates a license request 24 which includes a certificate and a digital signature. However, included in the license request 24 is a serial number which accompanied the product. Requestor 22 transmits license request 24 to LGE 26. LGE 26 retrieves the serial number from license request 24 and validates the serial number with serial number store 28. Serial number store 28 ensures that the serial number is a valid serial number. If valid, LGE 26 digitally signs license packet 24 to create a license packet 30, and stores license packet 30 in license store 32. LGE encrypts license packet 22, forming a license packet 34, and communicates license packet 34 to requestor 22.

Figure 3:
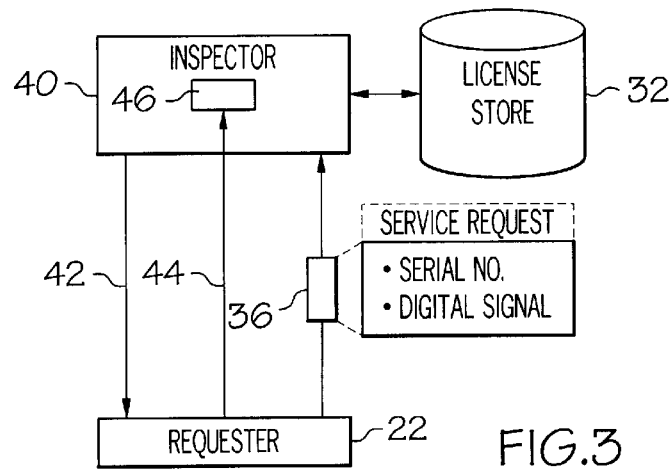
FIG. 3 is a block diagram illustrating interaction between a requestor and a license inspector according to one embodiment of the present invention.

FIG. 3 is a block diagram showing aspects of what can be described generally as the second phase of the invention, wherein an entity seeks post-sale services, and the vendor or service provider authenticates that the request originated from a licensed entity before access will be given to such services. Services that requestor 22 may seek include, for example, a software upgrade, access to a knowledge base of information about the product, or e-mail interaction with a technical service representative. Limiting such services to licensed users reduces overall costs for a vendor.

To initiate such a request, requestor 22 may access the Web site of the vendor, again with a conventional software utility such as a browser. The browser can use a "plug-in" specifically designed by the vendor to locate the serial number information on the computer associated with requestor 22, or can request that the user enter the serial number. The plug-in preferably generates a service request packet 36 which includes the serial number and the digital signature of requestor 22. Optionally, the digital certificate associated with requestor 22 can be included in service request packet 36. A license inspector 40 receives packet 36. License inspector 40 can be the same entity as the product vendor, or could be a separate service entity set up to handle such requests. Inspector 40 extracts the serial number from service request 36 and obtains the license packet associated with requestor 22 from license store 32 which had been previously stored by LGE 26. The license packet obtained from license store 32 can include the digital certificate of requestor 22, or the service request packet 36 may have contained the digital certificate of requestor 22. In either event, the digital certificate is itself preferably authenticated with the root key of the certifying authority. If valid, the public key from the digital certificate is used to decrypt the digital signature which accompanies the service request 36. Authentication can comprise ensuring that the digital signature of service request 36 can be decrypted with the public key from the license packet, and by comparing the serial number from the license packet with the serial number that accompanied the service request. Additionally, a certification revocation list (CRL) of public keys that have been revoked can be accessed. If the public key is on the CRL, access to requestor 22 can be denied. If requestor 22 is authenticated, inspector 40 informs requestor 22, as illustrated by arrow 42, that access to the desired service 46 is permitted. Requestor 22 can then access the desired service 46, as illustrated by arrow 44. If, is not authenticated, requestor 22 is denied access to service 46.

In the event requestor 22 is not authenticated, the vendor can inform the user that the software program is unlicensed, and give the user the immediate opportunity to purchase a licensed copy of the software. Moreover, the serial number can be used to determine the authorized user, and a communication can be sent to such user, such as by e-mail, for example, that an entity is attempting to use the serial number associated with this software to obtain support services.

The method and system according to the present invention eliminate the need for a vendor to provide human interaction to authenticate that an entity seeking support resources is in fact a licensed entity. Through the use of a digital certificate and public key cryptography, the vendor can be sure that the entity seeking access to the service is a licensed user, reducing overall support costs, and providing an opportunity for additional sales upon recognition of an unauthorized entity seeking services.

The foregoing description of preferred embodiments of the invention has been presented for purposes of illustration and description It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A method for validating a request, comprising:
   receiving, by a licensor, a license request including a digital certificate having a public key associated with a requestor, and a digital signature associated with the requestor;
   generating a license packet that includes a unique serial number;
   storing a record including the license packet in a memory wherein the record is encrypted with a public key associated with the licensor before being stored in the memory;
   generating a digital signature associated with the licensor and including the digital signature in the license packet;
   forwarding the license packet to the requestor;
   receiving a service request from the requestor, the service request including the digital signature associated with the requestor; and
   authenticating that the service request was sent by the requestor, and if so, fulfilling the request.

2. A method according to claim 1, wherein the memory comprises a license store being operative to contain a plurality of license packets associated with a plurality of requestors.

3. A method according to claim 1, wherein the license request includes a digital certificate associated with the requestor, and the record includes the digital certificate.

4. A method according to claim 3, wherein the authenticating step comprises extracting the public key associated with the requestor from the record, and using the public key to authenticate the request.

5. A method according to claim 1, wherein the unique serial number is obtained from a serial number store, the serial number store having a plurality of unique serial numbers.

6. A method according to claim 1, wherein the license request includes the unique serial number.

7. A method according to claim 1, wherein the service request includes the unique serial number.

8. A method according to claim 1, wherein the service request includes a digital certificate associated with the requestor, and the authenticating step comprises determining that the digital certificate was digitally signed by a valid certifying authority, and using a public key associated with the digital certificate to authenticate the request.

9. A computer-implemented method for validating an electronic request for a service, comprising:

providing to a user terms of a license agreement associated with a good;

receiving, from the requestor, an indication to be bound by the terms of the license;

generating a first packet that includes a certificate having a public key associated with the requestor, and a digital signature of the requestor;

communicating the first packet to a license granting entity;

obtaining, by the license granting entity, a serial number;

generating a second packet that includes the serial number;

storing the second packet in a store;

forwarding the second packet to the requestor;

receiving the second packet;

generating a request to obtain a service from a provider associated with the good, the request including the serial number and the digital signature of the requestor;

forwarding the request to the provider;

determining if the request is authentic, and if so, providing access to the service; and encrypting the second packet with a public key associated with the license granting entity before storing the second packet in the store.

10. A method according to claim 9, wherein the determining step comprises determining if one of the serial number and the digital signature from the request has a corresponding entry in the store.

11. A method according to claim 9, further comprising installing the good on the client computer in response to receiving the second packet.

12. A method according to claim 11, further comprising validating the serial number from the second packet before installing the good on the client computer.

13. A method according to claim 9, further comprising authenticating, by the license granting entity, that the digital certificate was digitally signed by a certifying authority.

* * * * *